US012610017B2

(12) United States Patent
Tsuchiya

(10) Patent No.: US 12,610,017 B2
(45) Date of Patent: Apr. 21, 2026

(54) COMMUNICATION APPARATUS

(71) Applicant: CANON KABUSHIKI KAISHA, Tokyo (JP)

(72) Inventor: Keigo Tsuchiya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 18/427,578

(22) Filed: Jan. 30, 2024

(65) Prior Publication Data

US 2024/0283876 A1 Aug. 22, 2024

(30) Foreign Application Priority Data

Feb. 20, 2023 (JP) ................................. 2023-024220

(51) Int. Cl.
*H04N 1/00* (2006.01)
*H04W 76/14* (2018.01)
*H04W 84/12* (2009.01)

(52) U.S. Cl.
CPC ..... *H04N 1/00315* (2013.01); *H04N 1/00408* (2013.01); *H04W 76/14* (2018.02); *H04W 84/12* (2013.01)

(58) Field of Classification Search
CPC .......... H04N 1/00315; H04N 1/00408; H04W 76/14
See application file for complete search history.

(56) References Cited

U.S. PATENT DOCUMENTS

2015/0250012 A1* 9/2015 Shibata ................. H04W 76/14
370/254
2019/0050175 A1* 2/2019 Moriya .................... H04L 5/06

FOREIGN PATENT DOCUMENTS

JP 2012019487 A 1/2012

* cited by examiner

*Primary Examiner* — Ibrahim Siddo
(74) *Attorney, Agent, or Firm* — Canon U.S.A., Inc. IP Division

(57) ABSTRACT

A communication apparatus capable of performing first and second wireless communications includes a reception unit configured to receive information about an external access point, a first display control unit configured to perform control to display a first setting screen where the 6 GHz band is settable as a frequency band used when the communication apparatus operates as a master station in the second wireless communication, a second display control unit configured to perform control to display a second setting screen where the 6 GHz band is not settable as the frequency band used when the communication apparatus operates as the master station in the second wireless communication, a specification unit configured to specify a communication channel of the 6 GHz band based on the frequency information, and a wireless communication control unit configured to control the communication apparatus to operate as the master station in the second wireless communication.

17 Claims, 6 Drawing Sheets

FIG.2A

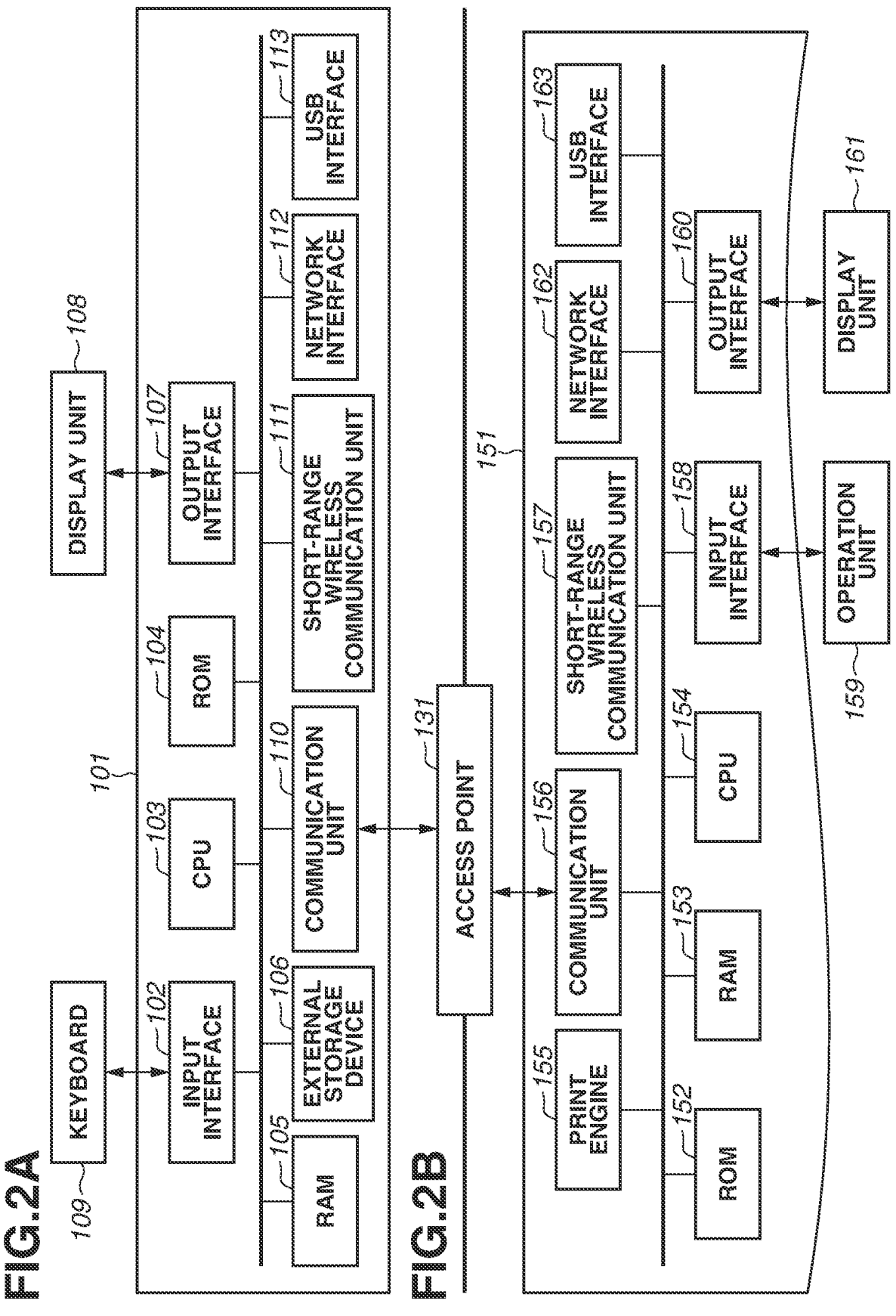

KEYBOARD 109

INPUT INTERFACE 102

DISPLAY UNIT 108

OUTPUT INTERFACE 107

RAM 105

EXTERNAL STORAGE DEVICE 106

CPU 103

ROM 104

COMMUNICATION UNIT 110

SHORT-RANGE WIRELESS COMMUNICATION UNIT 111

NETWORK INTERFACE 112

USB INTERFACE 113

ACCESS POINT 131

151

PRINT ENGINE 155

ROM 152

COMMUNICATION UNIT 156

RAM 153

CPU 154

SHORT-RANGE WIRELESS COMMUNICATION UNIT 157

INPUT INTERFACE 158

NETWORK INTERFACE 162

USB INTERFACE 163

OUTPUT INTERFACE 160

OPERATION UNIT 159

DISPLAY UNIT 161

COMMUNICATION APPARATUS

BACKGROUND

Field

The present disclosure relates to a communication apparatus.

Description of the Related Art

Japanese Patent Application Laid-Open No. 2012-19487 discusses a technique for enabling an image forming apparatus to perform in parallel wireless communication in an infrastructure mode through an access point and wireless communication in an ad-hoc mode.

In recent years, wireless communication has been used in various cases, and it is desirable to provide wireless communication high in convenience.

SUMMARY

According to one embodiment of the present disclosure, a communication apparatus capable of performing first wireless communication through an external access point and second wireless communication without the external access point includes at least one memory and at least one processor which function as a reception unit configured to receive, in a case where a wireless setting mode is enabled, information about an external access point outside the communication apparatus from a terminal apparatus through direct connection established with the terminal apparatus without the external access point, a first display control unit configured to perform, in a state where the communication apparatus is connected to the external access point based on the information about the external access point received by the reception unit and the communication apparatus is capable of acquiring frequency information usable in wireless communication of a 6 GHz band from an external system, control to display a first setting screen in which the 6 GHz band is settable as a frequency band to be used when the communication apparatus operates as a master station in the second wireless communication, a second display control unit configured to perform, in a state where the communication apparatus is not capable of acquiring the frequency information usable in the wireless communication of the 6 GHz band from the external system, control to display a second setting screen in which the 6 GHz band is not settable as the frequency band to be used when the communication apparatus operates as the master station in the second wireless communication, a specification unit configured to specify, in a case where the 6 GHz band is set in the first setting screen, a communication channel of the 6 GHz band based on the frequency information received from the external system, and a wireless communication control unit configured to control the communication apparatus to operate as the master station in the second wireless communication by using the specified channel.

Further features of the present disclosure will become apparent from the following description of exemplary embodiments with reference to the attached drawings.

BRIEF DESCRIPTION OF THE DRAWINGS

FIG. 2A is a diagram illustrating an example of a hardware configuration of a mobile terminal, and FIG. 2B is a diagram illustrating an example of a hardware configuration of an image forming apparatus.

DESCRIPTION OF THE EMBODIMENTS

A preferred exemplary embodiment of the present disclosure is to be described in detail with reference to drawings. The present exemplary embodiment is merely illustrative, and specific examples of components, process steps, displayed screens, and the like are not intended to limit the scope of the present invention unless otherwise noted.
(System Configuration)

Figure 1:
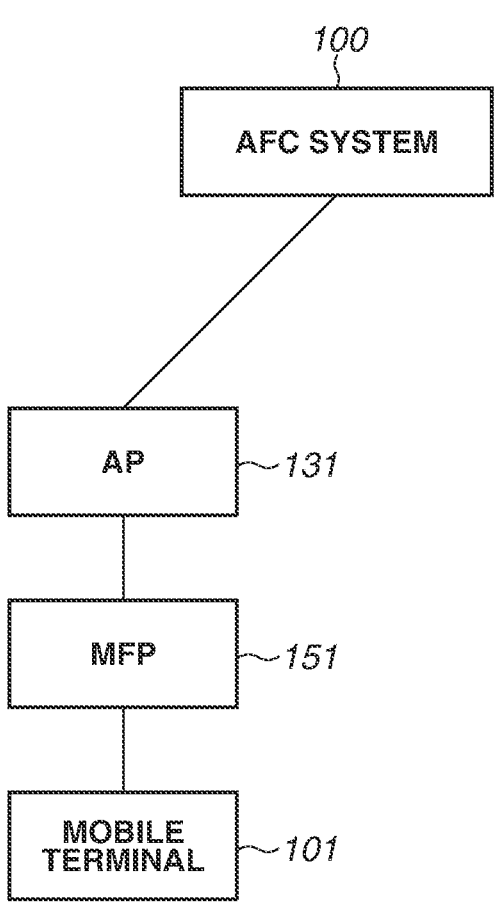
FIG. 1 is a diagram illustrating an example of a system configuration according to an exemplary embodiment.

FIG. 1 illustrates a configuration example of a system according to the present exemplary embodiment. As an example, the system is a wireless communication system in which a plurality of communication apparatuses can wirelessly communicate with each other. In the example in FIG. 1, the system includes an access point (AP) 131, a multi-functional peripheral (MFP) 151, and a mobile terminal 101. The mobile terminal 101 is an example of a mobile terminal, and is a laptop personal computer or a smartphone. The system includes an automated frequency coordination (AFC) system 100. The MFP 151 can communicate with the AFC system 100 through the AP 131. The MFP 151 in the present exemplary embodiment can perform wireless communication using at least a 6 GHz band, and operates as a standard power device. The limitation of transmission power is low for the standard power device as compared with a very low power device and a lower power indoor-only device. In contrast, an apparatus operating as a standard power device inquires of the AFC system 100 about a frequency range or channel usable in the wireless communication of a 6 GHz band, and receives an answer, thereby determining the frequency range or channel to be used in the wireless communication of the 6 GHz band. In the present exemplary embodiment, the AFC system is also referred to as an external system. The external system that can determine the frequency range or channel to be used in the wireless communication of the 6 GHz band is not limited to the AFC system.

The MFP 151 includes a printing function, a reading function (scanner), and a facsimile (FAX) function. The MFP 151 in the present exemplary embodiment has a communication function for performing wireless communication with the mobile terminal 101. In the present exemplary embodiment, a case where the MFP 151 is used is to be described as an example, but the apparatus is not limited to the example. For example, a facsimile apparatus, a scanner apparatus, a projector, or a single function printing apparatus may be used in place of the MFP 151. In the present exemplary embodiment, an apparatus including a printing function is also referred to as an image forming apparatus.

The access point 131 is provided separately from (outside of) the mobile terminal 101 and the MFP 151, and operates as a base station apparatus for a wireless local area network (WLAN). The access point 131 is also referred to as the external access point 131 or an external wireless base station (or external master station). The MFP 151 having a WLAN communication function can perform communication in a WLAN infrastructure mode through the access point 131. In the following description, the access point is also referred to as an "AP". The infrastructure mode is also referred to as a "wireless infrastructure mode".

The infrastructure mode is a mode in which the MFP 151 communicates with another apparatus through an external apparatus (e.g., access point 131) forming a network. Connection with the external access point established by the MFP 151 operating in the infrastructure mode is referred to as infrastructure connection. In the present exemplary embodiment, in the infrastructure connection, the MFP 151 operates as a slave station, and the external access point operates as a master station. In the present exemplary embodiment, the master station is an apparatus determining a communication channel to be used in a network to which the master station belongs, and the slave station is an apparatus that does not determine a communication channel to be used in a network to which the slave station belongs, and uses a communication channel determined by the master station.

The access point 131 performs wireless communication with a communication apparatus permitted (authenticated) to access the access point 131, and relays wireless communication between the communication apparatus and another communication apparatus. The access point 131 is connected to, for example, a wired communication network, and can relay communication between a communication apparatus connected to the wired communication network and another communication apparatus wirelessly connected to the access point 131.

The mobile terminal 101 and the MFP 151 perform wireless communication in the wireless infrastructure mode through the external access point 131 or in a peer-to-peer mode without the external access point 131 by using their own WLAN communication functions. In the following description, the peer-to-peer mode is also referred to as a "P2P" mode. Alternatively, the communication without the external access point 131 is also referred to as direct wireless communication. The P2P mode includes Wi-Fi Direct® and a software AP mode. In the following description, Wi-Fi Direct® is also referred to as WFD. The P2P mode is communication complying with Institute of Electrical and Electronics Engineers (IEEE) 802.11 series.

The P2P mode is a mode in which the MFP 151 directly communicates with another apparatus such as the mobile terminal 101 without an external apparatus forming a network. In the present exemplary embodiment, the P2P mode includes an AP mode in which the MFP 151 operates as an access point. Connection information (service set identifier (SSID) and password) on the access point enabled inside the MFP 151 in the AP mode is optionally settable by a user. The P2P mode may include, for example, a WFD mode for the MFP 151 to perform communication through WFD. Among a plurality of WFD compatible apparatuses, an apparatus operating as the master station is determined based on, for example, a sequence called Group Owner Negotiation. The master station may be determined without performing Group Owner Negotiation. In particular, an apparatus that is a WFD compatible apparatus and serves as the master station is referred to as a group owner. Direct connection with another apparatus established by the MFP 151 operating in the P2P mode is referred to as direct connection. In the present exemplary embodiment, in the direct connection, the MFP

151 operates as the master station, and another apparatus (e.g., mobile terminal 101) operates as the slave station.

The AFC system 100 answers the usable frequency range or channel to the inquiry (inquired frequency range or inquired channel) from the apparatus as described above.

A configuration of the mobile terminal according to the present exemplary embodiment, and a configuration of a communication apparatus that can communicate with the mobile terminal according to the present exemplary embodiment are to be described with reference to FIGS. 2A and 2B. In the present exemplary embodiment, the following configurations are to be described as examples, but the present exemplary embodiment is applicable to an apparatus that can communicate with the communication apparatus, and functions are not particularly limited to functions illustrated in the drawings.

The mobile terminal 101 includes an input interface 102, a central processing unit (CPU) 103, a read only memory (ROM) 104, a random access memory (RAM) 105, an external storage device 106, an output interface 107, a display unit 108, a keyboard 109, a communication unit 110, a short-range wireless communication unit 111, a network interface 112, and a universal serial bus (USB) interface 113. A computer of the mobile terminal 101 is formed of the CPU 103, the ROM 104, the RAM 105, and the like.

The input interface 102 is an interface for receiving data input and an operation instruction from the user through operation of an operation unit such as the keyboard 109. The operation unit may be a physical keyboard, a physical button, and the like, or a software keyboard, a software button, and the like displayed on the display unit 108. In other words, the input interface 102 may receive input (operation) from the user through the display unit 108.

The CPU 103 is a system control unit that controls the whole of the mobile terminal 101. The ROM 104 stores fixed data such as control programs, data tables, and an embedded operating system (hereinafter, referred to as OS) program to be executed by the CPU 103. In the present exemplary embodiment, each of the control programs stored in the ROM 104 performs software execution control such as scheduling, task switching, and interruption processing under the management of the embedded OS stored in the ROM 104.

The RAM 105 includes a static random access memory (SRAM) requiring a backup power supply. The RAM 105 holds data by a primary battery for data backup (not illustrated). For this reason, the RAM 105 can store important data such as program control variables without volatilizing the data. A memory area storing setting information on the mobile terminal 101, management data on the mobile terminal 101, and the like is also provided in the RAM 105. The RAM 105 is also used as a main memory and a work memory for the CPU 103.

The external storage device 106 holds, for example, a print information generation program for generating print information that can be interpreted by the MFP 151. The output interface 107 is an interface controlling the display unit 108 to display data and to notify a state of the mobile terminal 101.

The display unit 108 includes a light-emitting diode (LED) and a liquid crystal display (LCD), and displays data and notifies the state of the mobile terminal 101. The communication unit 110 is a component connected to an apparatus such as the MFP 151 and the AP 131, to perform data communication. For example, the communication unit 110 can be connected to the access point (not illustrated) inside the MFP 151. When the communication unit 110 and the access point inside the MFP 151 are connected, the mobile terminal 101 and the MFP 151 can perform P2P communication. The communication unit 110 may directly communicate with the MFP 151 through wireless communication, or may communicate with the MFP 151 through an external apparatus such as the AP 131 outside the mobile terminal 101 and the MFP 151. The external apparatus includes an external access point (e.g., access point 131) outside the mobile terminal 101 and the MFP 151, and an apparatus that can relay communication other than the access point. In the present exemplary embodiment, a wireless communication scheme used by the communication unit 110 is Wireless Fidelity (Wi-Fi®) that is a communication standard complying with the IEEE802.11 series. Examples of the access point 131 include an apparatus such as a wireless LAN router.

The short-range wireless communication unit 111 is a component for establishing wireless connection with an apparatus such as the MFP 151 at a short range, to perform data communication, and performs communication by a communication scheme different from the communication scheme of the communication unit 110.

The short-range wireless communication unit 111 can be connected to, for example, a short-range wireless communication unit 157 inside the MFP 151. Examples of the communication scheme include near field communication (NFC), Bluetooth® classic, Bluetooth® Low Energy (BLE), and Wi-Fi® Aware.

The network interface 112 is a connection interface (I/F) controlling wireless communication and communication through a wired LAN cable.

The USB interface 113 is a connection I/F controlling USB connection through a USB cable. More specifically, the USB interface 113 is an interface connected to an apparatus such as the MFP 151 and the external access point 131 through USB, thereby performing data communication.

The MFP 151 is to be described. The MFP 151 includes a ROM 152, the RAM 153, the CPU 154, a print engine 155, a communication unit 156, the short-range wireless communication unit 157, an input interface 158, an operation unit 159, an output interface 160, a display unit 161, a network interface 162, and a USB interface 163. A computer of the MFP 151 is formed of the ROM 152, the RAM 153, the CPU 154, and the like.

The communication unit 156 controls communication processing using each interface. For example, the MFP 151 can operate in the infrastructure mode and the P2P mode as a mode for performing communication using the communication unit 156.

More specifically, the communication unit 156 can operate as the access point inside the MFP 151. For example, when the user issues an instruction to enable the internal access point, the MFP 151 operates as the access point. In the present exemplary embodiment, a wireless communication scheme used by the communication unit 156 is a communication standard complying with the IEEE802.11 series. In the present exemplary embodiment, the wireless communication scheme used by the communication unit 156 is a communication standard complying with at least IEEE802.11ax. In the following description, Wi-Fi® is a communication standard complying with the IEEE802.11 series. The communication unit 156 may include hardware functioning as the access point, or may operate as the access point by software for causing the communication unit 156 to function as the access point. In a case where the MFP 151 operates as the master station, the communication unit 156 can maintain P2P wireless communication with a predetermined number or less of (e.g., three or less) slave stations in parallel. The communication unit 156 can perform wireless communication by using a frequency band selected from 2.4 GHz, 5 GHZ, and 6 GHz.

The short-range wireless communication unit 157 is a component for establishing wireless connection with an apparatus such as the mobile terminal 101 at a short range, and can be connected to, for example, the short-range wireless communication unit 111 inside the mobile terminal 101. Examples of the communication scheme include NFC, Bluetooth® Classic, Bluetooth® Low Energy (BLE), and Wi-Fi® Aware.

The RAM 153 includes an SRAM requiring a backup power supply. The RAM 153 holds data by a primary battery for data backup (not illustrated). For this reason, the RAM 153 can store important data such as program control variables without volatilizing the data. A memory area storing setting information on the MFP 151, management data on the MFP 151, and the like is also provided in the RAM 153. The RAM 153 is also used as a main memory and a work memory for the CPU 154, and stores a reception buffer for temporarily storing print information received from the mobile terminal 101 and the like, and various kinds of information.

The ROM 152 stores fixed data such as control programs, data tables, and an OS program to be executed by the CPU 154. In the present exemplary embodiment, each of the control programs stored in the ROM 152 performs software execution control such as scheduling, task switching, and interruption processing under the management of the embedded OS stored in the ROM 152.

The CPU 154 is a system control unit that controls the whole of the MFP 151.

The print engine 155 performs print processing for imparting a recording agent such as ink to a recording medium such as a sheet to form an image on the recording medium, based on information stored in the RAM 153 or a print job received from the mobile terminal 101 or the like, thereby outputting a print result. A data amount of the print job transmitted from the mobile terminal 101 or the like is generally large. Accordingly, it is desirable to use a communication scheme enabling high-speed communication for communication of the print job. For this reason, the MFP 151 receives the print job through the communication unit 156 that can perform high-speed communication as compared with the short-range wireless communication unit 157. The printing using ink is illustrative, and printing may be performed by an electrophotographic method using toner. The MFP may be of a cartridge type in which an ink cartridge is attached, or of a type in which ink is replenished to an ink tank of the MFP from an ink bottle.

A memory such as an external hard disk drive (HDD) and a secure digital (SD) card may be mounted as an optional device on the MFP 151, and information stored in the MFP 151 may be stored in the memory.

The input interface 158 is an interface for receiving data input and an operation instruction from the user through operation of the operation unit 159 such as a physical button. The operation unit 159 may be a software keyboard, a software button, and the like displayed on the display unit 161.

In other words, the input interface 158 may receive input from the user through the display unit 161.

The output interface 160 is an interface controlling the display unit 161 to display data and to notify a state of the MFP 151.

The display unit 161 includes an LED and an LCD, and displays data and notifies the state of the MFP 151.

The USB interface 163 is an interface controlling USB connection through a USB cable. More specifically, the USB interface 163 is an interface connected to an apparatus such as the mobile terminal 101 and the external access point 131 through USB, thereby performing data communication.

Figure 3:
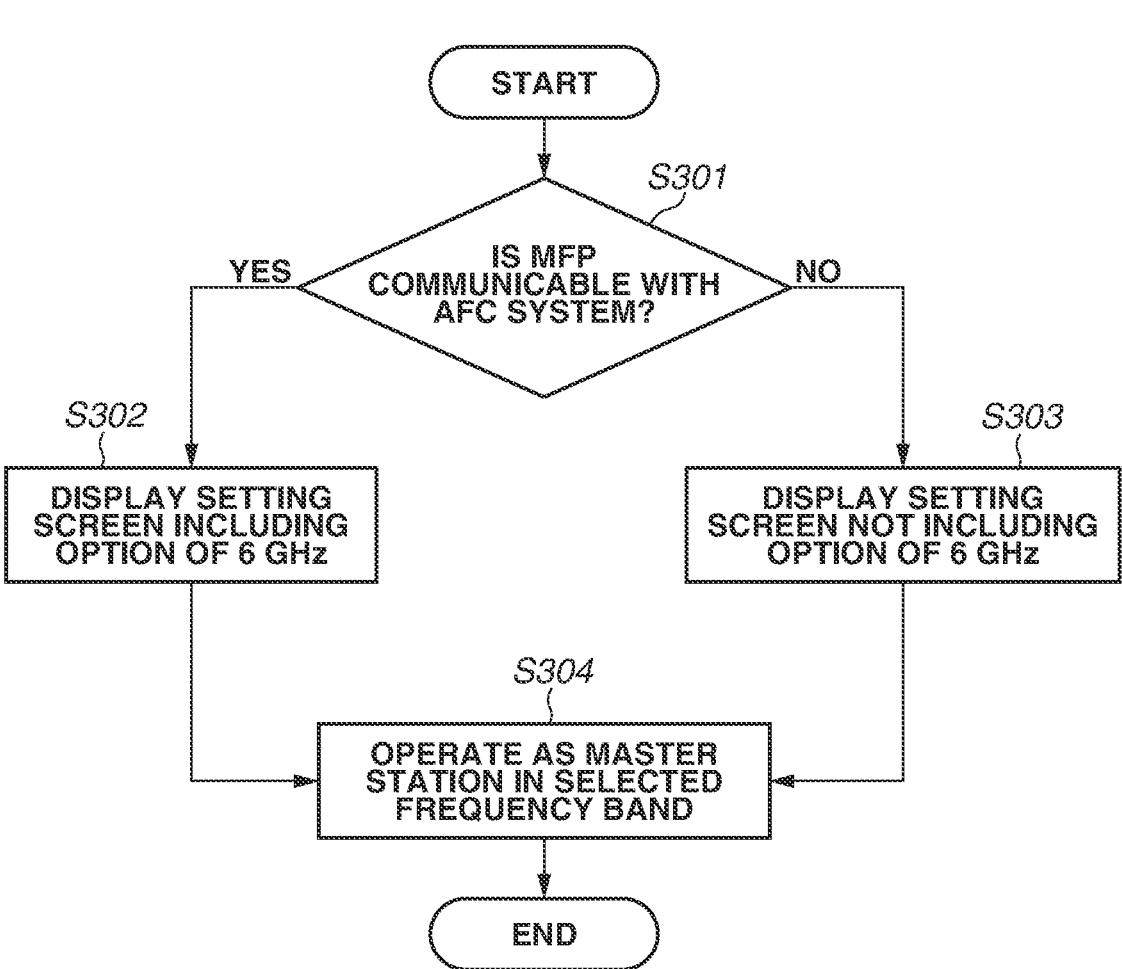
FIG. 3 is a flowchart illustrating an example of processing performed by a communication apparatus.

FIG. 3 is a flowchart of processing performed by the MFP 151 according to the present exemplary embodiment. The processing in the flowchart according to the present exemplary embodiment is realized when the CPU 154 reads out programs relating to the processing in the flowchart from the ROM 152 and executes the programs. The processing in the flowchart of FIG. 3 is started in a case where the user selects "setting of frequency band" 401 in a setting screen 400 illustrated in FIG. 4A.

In step S301, the CPU 154 determines whether the MFP 151 can communicate with the AFC system 100. The processing in step S301 may be realized by, for example, determining whether the infrastructure mode has been enabled or determining whether the infrastructure connection has been established. The processing in step S301 may be realized by determining whether the MFP 151 can communicate with the AFC system 100.

Figures 4A, 4B, 4C:
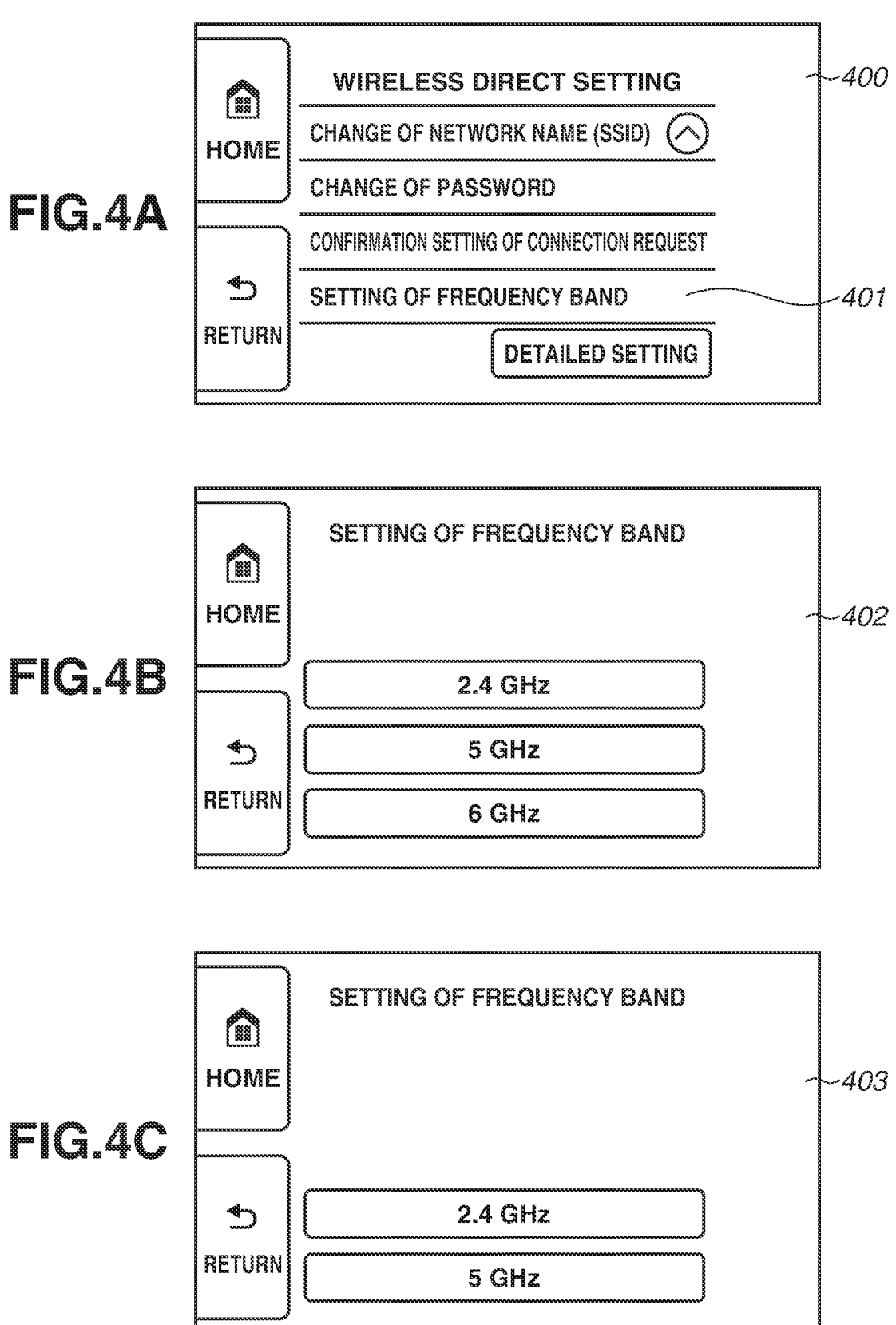
FIGS. 4A to 4C are diagrams each illustrating an example of a screen displayed on the communication apparatus.

In a case where the CPU 154 determines that the MFP 151 can communicate with the AFC system 100 in step S301 (YES in step S301), the processing proceeds to step S302. In step S302, the CPU 154 displays a setting screen including an option of 6 GHz. In a case where the CPU 154 determines that the MFP 151 cannot communicate with the AFC system 100 in step S301 (NO in step S301), the processing proceeds to step S303. In step S303, the CPU 154 displays a setting screen not including an option of 6 GHz. For example, a setting screen 402 illustrated in FIG. 4B is displayed in step S302, and a setting screen 403 illustrated in FIG. 4C is displayed in step S303. FIG. 4C illustrates a screen in which the option of 6 GHz is hidden. Alternatively, for example, a screen in which the option of 6 GHz is grayed out may be displayed as long as a screen in which the user cannot select the option of 6 GHz is displayed. In the case where the CPU 154 determines whether the MFP 151 cannot communicate with the AFC system 100 in step S301 (NO in step S301), the CPU 154 may display the screen as illustrated in FIG. 4B, and in a case where the option of 6 GHz is selected, the CPU 154 may display a message indicating that the option of 6 GHz is unselectable.

In step S304, the CPU 154 starts up the internal access point in the frequency band selected in the setting screen 402 or the setting screen 403, and the MFP 151 operates as the master station.

Figure 5:
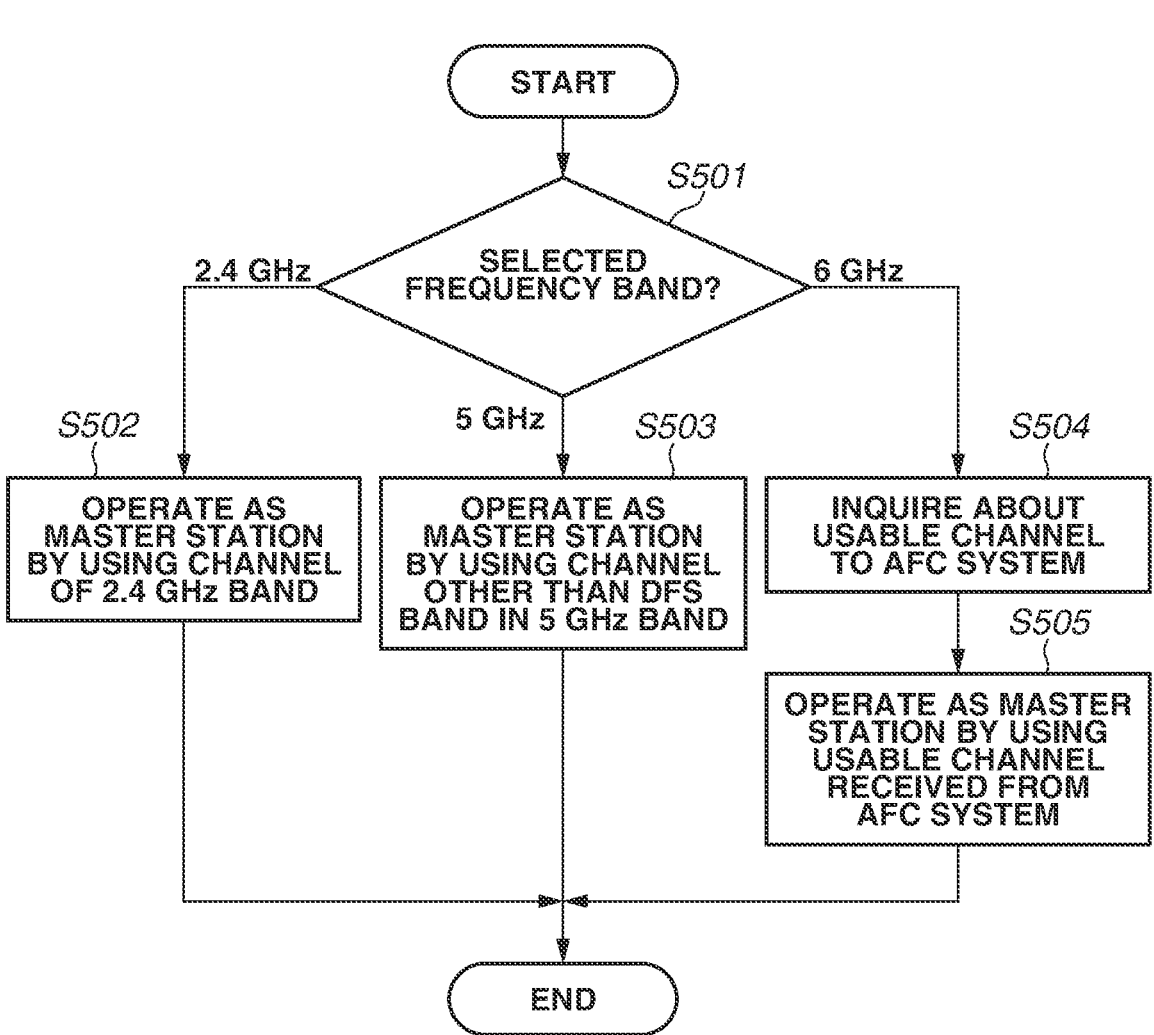
FIG. 5 is a flowchart illustrating an example of processing performed by the communication apparatus.

Detailed processing in step S304 is to be described with reference to FIG. 5.

In step S501, the CPU 154 determines the frequency band selected in the screen illustrated in FIG. 4B or FIG. 4C.

In a case where the CPU 154 determines that an option of 2.4 GHz has been selected (2.4 GHz in step S501), the processing proceeds to step S502. In step S502, the CPU 154 selects a channel of 2.4 GHz, and the MFP 151 operates as the master station. At this time, the channel same as the channel used for the infrastructure communication may be selected, or a channel different from the channel used for the infrastructure communication may be selected.

In a case where the CPU 154 determines that an option of 5 GHz has been selected (5 GHz in step S501), the processing proceeds to step S503. In step S503, the CPU 154 selects a channel of a non-dynamic frequency selection (non-DFS) band out of channels of a 5 GHz band, and the MFP 151 operates as the master station. The channel of the non-DFS band corresponds to a channel of a band W52. The reason why the channel of the non-DFS band is selected is because the MFP 151 does not have a DFS function.

In a case where the CPU 154 determines that the option of 6 GHz has been selected (6 GHz in step S501), the processing proceeds to step S504. In step S504, the CPU 154 inquires of the AFC system 100 about a usable channel. At this time, the CPU 154 inquires of the AFC system 100 about, for example, the channel usable for communication of 80 MHz in UNII-5 (5925 MHz to 6425 MHz). The AFC system 100 having received the inquiry answers the channel usable for communication of 80 MHz in UNII-5.

In step S505, the MFP 151 operates as the master station by using the usable channel received from the AFC system 100. In a case where a plurality of channels is received as the usable channels in step S505, the CPU 154 may select a channel based on the channel used for the infrastructure communication. For example, the CPU 154 may select a channel different from the channel used for the infrastructure communication.

Operation for infrastructure-connecting the MFP 151 to an external access point is to be described with reference to FIG. 6.

In step S601, the MFP 151 enables a setup mode of the MFP 151 based on a user instruction on an operation panel. In step S602, the MFP 151 starts up the internal AP held by the MFP 151 in response to enabling of the setup mode in step S601. Even in a state where the infrastructure connection with the AP is established before step S601, the setup mode can be enabled in step S601. In this case, the infrastructure connection is disconnected.

In step S603, a setup application is started up in response to an instruction from the user.

Note that, in the present exemplary embodiment, a mode in which wireless setting processing of the MFP 151 is performed from a PC is to be described, but the wireless setting processing of the MFP 151 is not limited to this configuration. In other embodiments, the wireless setting processing of the MFP 151 may be performed from, for example, a mobile terminal such as a smartphone.

When the user operates the setup application and issues an instruction to perform the wireless setting processing, the setup application performs direct connection processing with the internal AP. For example, the setup application holds the SSID and the password of the internal AP from a time when the setup application is installed. Accordingly, in a case where execution of the wireless setting processing is instructed, the setup application reads out the SSID and the password of the internal AP, and issues an instruction to establish direct connection between the PC and the MFP 151 by using the information.

In step S604, in response to the instruction, the direct connection between the PC and the internal AP of the MFP 151 is established.

In step S605, the setup application instructs the MFP 151 to search for an AP through the direct connection established in step S604.

In step S606, the MFP 151 searches for an AP with which the MFP 151 can communicate, in response to the instruction in step S605. In step S607, the MFP 151 transmits an SSID list as a search result.

In step S608, the setup application transmits an SSID selected from the SSID list received in step S607 and a password thereof, as AP information. For example, the setup application displays the SSID list received in step S607, and receives selection from the user. The setup application displays an input screen of a password corresponding to the selected SSID, and transmits the input password and the selected SSID as the AP information.

Alternatively, in a case where the PC establishes connection with the AP 131 immediately before step S604 and the SSID of the AP 131 is included in the SSID list transmitted in step S607, the setup application transmits the SSID and the password of the AP 131 in step S605. In contrast, in a case where the PC establishes connection with the AP 131 immediately before step S604 and the SSID of the AP 131 is not included in the SSID list transmitted in step S607, the setup application may display the SSID list received in step S607, and receive selection by the user.

In a case where MP 151 receives the AP information transmitted in step S608, the MFP 151 stops the internal AP in step S609. In step S610, the MFP 151 establishes the infrastructure connection by using the AP information transmitted in step S608.

Figure 6:
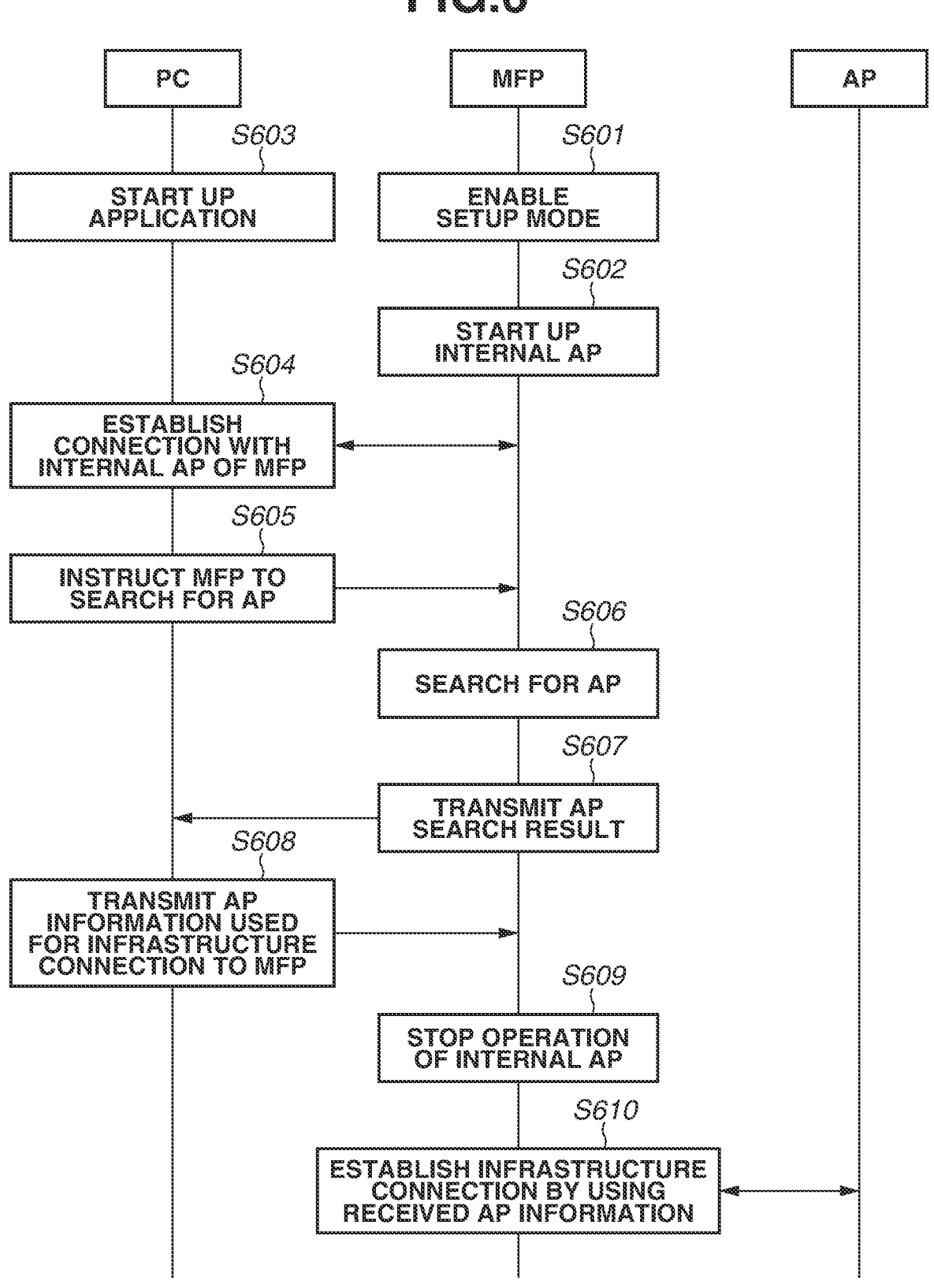
FIG. 6 is a diagram illustrating an example of an operation flow for infrastructure-connecting the communication apparatus to an external access point.

In a case where the AFC system 100 and the MFP 151 can communicate with each other by the processing in FIG. 6, when the user selects "setting of frequency band" 401 in the setting screen illustrated in FIG. 4A by using the operation panel of the MFP 151, the processing in step S302 is performed, and the setting screen illustrated in FIG. 4B is displayed. In a case where the MFP 151 establishes the infrastructure connection with the external AP by the processing in FIG. 6 but the MFP 151 cannot communicate with the AFC system 100, when the user selects "setting of frequency band" 401 in the setting screen illustrated in FIG. 4A by using the operation panel of the MFP 151, the processing in step S303 is performed, and the setting screen illustrated in FIG. 4C is displayed.

In the above-described exemplary embodiment, the mode in which, in the case where the setup mode is instructed, the MFP 151 starts up the internal AP of the MFP 151, and establishes the direct connection with the external terminal (e.g., PC) to receive the AP information from the external terminal is described, but the other mode may be adopted. For example, in the case where the setup mode is instructed, the MFP 151 may establish connection with a PC or a smartphone around the MFP 151 through Bluetooth®. Thereafter, the above-described processing in steps S604 to S608 may be performed through the Bluetooth® connection. Alternatively, the communication scheme is not limited to Bluetooth®, and the other communication scheme may be used.

The processing for infrastructure-connecting the MFP 151 to the external access point is described with reference to FIG. 6, but the other method can be used. For example, when the user selects infrastructure setting on the operation panel of the MFP 151, a list of SSIDs selectable in the MFP 151 may be displayed on the operation panel. When the user selects a desired SSID, the infrastructure connection with the external access point corresponding to the SSID may be established.

By the above-described processing, the direct communication between the MFP 151 operating as the master station and the mobile terminal 101 is enabled. For example, the MFP 151 may perform print processing based on print data received from the mobile terminal 101. The MFP 151 may transmit remaining amounts of consumables to the mobile terminal 101 by using the direct communication. The remaining amounts of consumables correspond to, for example, remaining amounts of ink or toner.

In the above-described exemplary embodiment, the MFP 151 is described as an example, but the above-described exemplary embodiment may be implemented in the other apparatuses. For example, an apparatus such as a digital camera, a single function printer, a single function scanner, a projector, and a smartphone may perform the processing according to the above-described exemplary embodiment.

According to the present exemplary embodiment, it is possible to provide wireless communication high in convenience.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-024220, filed Feb. 20, 2023, which is hereby incorporated by reference herein in its entirety.

What is claimed is:

1. A communication apparatus capable of performing first wireless communication through an external access point and second wireless communication without an external access point, the communication apparatus comprising at least one memory and at least one processor which function as:

a reception unit configured to receive, in a case where a wireless setting mode is enabled, information about an external access point outside the communication apparatus from a terminal apparatus through direct connection established with the terminal apparatus without the external access point;

a first display control unit configured to perform, in a state where the communication apparatus is connected to the external access point based on the information about the external access point received by the reception unit and the communication apparatus is capable of acquiring frequency information usable in wireless communication of a 6 GHz band from an external system, control to display a first setting screen in which the 6 GHz band is settable as a frequency band to be used when the communication apparatus operates as a master station in the second wireless communication;

a second display control unit configured to perform, in a state where the communication apparatus is not capable of acquiring the frequency information usable in the wireless communication of the 6 GHz band from the external system, control to display a second setting screen in which the 6 GHz band is not settable as the frequency band to be used when the communication apparatus operates as the master station in the second wireless communication;

a specification unit configured to specify, in a case where the 6 GHz band is set in the first setting screen, a communication channel of the 6 GHz band based on the frequency information received from the external system; and a wireless communication control unit configured to control the communication apparatus to operate as the master station in the second wireless communication by using the specified channel.

2. The communication apparatus according to claim 1, wherein, in a case where a plurality of usable communication channels of the 6 GHz band is specified based on the frequency information, the specification unit specifies a communication channel of the 6 GHz band based on a communication channel used in the first wireless communication.

3. The communication apparatus according to claim 2, wherein the specification unit specifies a communication channel different from the communication channel used in the first wireless communication.

4. The communication apparatus according to claim 1, wherein the at least one memory and the at least one processor further function as a print control unit configured to control the communication apparatus to perform print processing on a sheet based on print data received through the second wireless communication.

5. The communication apparatus according to claim 1, wherein the communication apparatus transmits a remaining amount of ink to a communication partner apparatus through the second wireless communication.

6. The communication apparatus according to claim 1, wherein the first setting screen is a screen in which an option for setting the 6 GHz band as the frequency band to be used when the communication apparatus operates as the master station in the second wireless communication is displayed, and wherein the second setting screen is a screen in which the option for setting the 6 GHz band as the frequency band to be used when the communication apparatus operates as the master station in the second wireless communication is not displayed.

7. The communication apparatus according to claim 1, wherein the first setting screen is a screen in which an option for setting the 6 GHZ band as the frequency band to be used when the communication apparatus operates as the master station in the second wireless communication is displayed to be selectable, and wherein the second setting screen is a screen in which the option for setting the 6 GHz band as the frequency band to be used when the communication apparatus operates as the master station in the second wireless communication is displayed not to be selectable.

8. The communication apparatus according to claim 1, wherein, based on selection of an option corresponding to the 6 GHz band displayed on the first setting screen, the 6 GHz band is set as the frequency band to be used when the communication apparatus operates as the master station in the second wireless communication, and wherein, even when the option corresponding to the 6 GHz band displayed on the second setting screen is selected, the 6 GHz band is not set as the frequency band to be used when the communication apparatus operates as the master station in the second wireless communication.

9. The communication apparatus according to claim 1, wherein the second display control unit further performs control to display a predetermined notification without setting the 6 GHz band as the frequency band to be used when the communication apparatus operates as the master station in the second wireless communication, based on selection of an option corresponding to the 6 GHz band displayed on the second setting screen.

10. The communication apparatus according to claim 1, wherein the state where the communication apparatus is capable of acquiring the frequency information usable in the wireless communication of the 6 GHz band from the external system is a state where the first wireless communication is operable.

11. The communication apparatus according to claim 1, wherein the state where the communication apparatus is capable of acquiring the frequency information usable in the wireless communication of the 6 GHz band from the external system is a state where the communication apparatus is communicable with an automated frequency coordination (AFC) system as the external system.

12. The communication apparatus according to claim 11, wherein the specification unit specifies a communication channel of the 6 GHz band based on frequency information acquired from the AFC system.

13. The communication apparatus according to claim 1, wherein the first wireless communication and the second wireless communication are communications complying with Institute of Electrical and Electronics Engineers (IEEE) 802.11 series, wherein the first wireless communication is communication in an infrastructure mode, and wherein the second wireless communication is communication in a peer-to-peer mode.

14. The communication apparatus according to claim 1, wherein the master station in the second wireless communication determines a communication channel to be used in the second wireless communication.

15. The communication apparatus according to claim 1, wherein the second display control unit performs control to display the second setting screen when the communication apparatus operates as a standard power device.

16. A method of controlling a communication apparatus capable of performing first wireless communication through an external access point and second wireless communication without an external access point, the method comprising:

receiving, after a wireless setting mode is enabled, information about an external access point outside the communication apparatus from a terminal apparatus through direct connection established with the terminal apparatus without the external access point;

performing, in a state where the communication apparatus is connected to the external access point based on the received information about the external access point and the communication apparatus is capable of acquiring frequency information usable in wireless communication of a 6 GHz band from an external system, control to display a first setting screen in which the 6 GHz band is settable as a frequency band to be used when the communication apparatus operates as a master station in the second wireless communication;

performing, in a state where the communication apparatus is not capable of acquiring the frequency information usable in the wireless communication of the 6 GHz band from the external system, control to display a second setting screen in which the 6 GHz band is not settable as the frequency band to be used when the communication apparatus operates as the master station in the second wireless communication;

specifying, after the 6 GHz band is set in the first setting screen, a communication channel of the 6 GHz band based on the frequency information received from the external system; and controlling the communication apparatus to operate as the master station in the second wireless communication by using the specified channel.

17. A non-transitory computer-readable storage medium storing one or more programs configured to cause one or more computers to function as:

a reception unit configured to receive, in a case where a wireless setting mode is enabled, information about an external access point outside the communication apparatus from a terminal apparatus through direct connection established with the terminal apparatus without the external access point;

a first display control unit configured to perform, in a state where the communication apparatus is connected to the external access point based on the information about the external access point received by the reception unit and the communication apparatus is capable of acquiring frequency information usable in wireless communication of a 6 GHz band from an external system, control to display a first setting screen in which the 6 GHz band is settable as a frequency band to be used when the communication apparatus operates as a master station in the second wireless communication;

a second display control unit configured to perform, in a state where the communication apparatus is not capable of acquiring the frequency information usable in the wireless communication of the 6 GHz band from the external system, control to display a second setting screen in which the 6 GHz band is not settable as the frequency band to be used when the communication apparatus operates as the master station in the second wireless communication;

a specification unit configured to specify, in a case where the 6 GHz band is set in the first setting screen, a communication channel of the 6 GHz band based on the frequency information received from the external system; and a wireless communication control unit configured to control the communication apparatus to operate as the master station in the second wireless communication by using the specified channel.

* * * * *